United States Patent
Meier

Patent Number: 5,970,148
Date of Patent: Oct. 19, 1999

[54] LOW COST ENCRYPTION TRANSPONDER

[75] Inventor: Herbert Meier, Moosburg, Germany

[73] Assignee: Texas Instruments Deutschland, GmbH, Germany

[21] Appl. No.: 08/850,423

[22] Filed: May 2, 1997

[51] Int. Cl.[6] .............................. H04L 9/06; H04L 9/00; G01S 13/74

[52] U.S. Cl. .................................. 380/42; 380/9; 380/46; 380/49; 380/50; 342/42; 342/43; 342/51

[58] Field of Search .................................. 380/9, 23, 25, 380/29, 30, 42, 43, 44, 46, 49, 50, 59, 21, 24; 342/42, 43, 44, 45, 46, 47, 48, 49, 50, 51; 235/379, 380

[56] References Cited

U.S. PATENT DOCUMENTS

| | | | |
|---|---|---|---|
| 5,430,447 | 7/1995 | Meier | 342/51 |
| 5,832,090 | 11/1998 | Raspotnik | 380/24 |

*Primary Examiner*—Bernarr E. Gregory
*Attorney, Agent, or Firm*—Rebecca Mapstone Lake; Richard L. Donaldson

[57] ABSTRACT

Novel means of achieving increased security while still obtaining a low cost, manufacturable device are disclosed and claimed. The first mode of operation is the learn mode which provides means for initial checkout with no security. In the learn mode of operation, the interrogator and transponder may be switched to a predetermined error detection algorithm, i.e. CCITT(Start Mask, CCITT Mask), and certain information is programmed into the transponder memory. During programming, all the bits received from the interrogator are shifted through the preintialized CRC generator. In addition, once the transponder response is sent back to the interrogator, the response is also shifted through a preinitialized CRC generator within the interrogator(which could be a software implementation). Because neither the Cypher Key nor the Function Key are directly readable once programmed, an encryption must be performed to verify the proper Cypher Key and Function Key were programmed into the transponder's memory. In the second and encryption mode of operation, after a special Command/Address is transmitted, a Random Number (which may vary in length but which has a minimum length) is transmitted from the interrogator to the transponder which in turn generates the Signature by shifting the Random Number through the CRC Encryption Generator (initialized with the Cypher and Function Key). The Signature along with data, status and address are transmitted back to the interrogator which in the meantime has predetermined the awaited Signature using the same Cypher and Function Key. If the received Signature and calculated Signature are equal validation is positive and then the programmed data must be locked(especially the Cypher Key and Function Key) to protect them against reprogramming in the future.

36 Claims, 2 Drawing Sheets

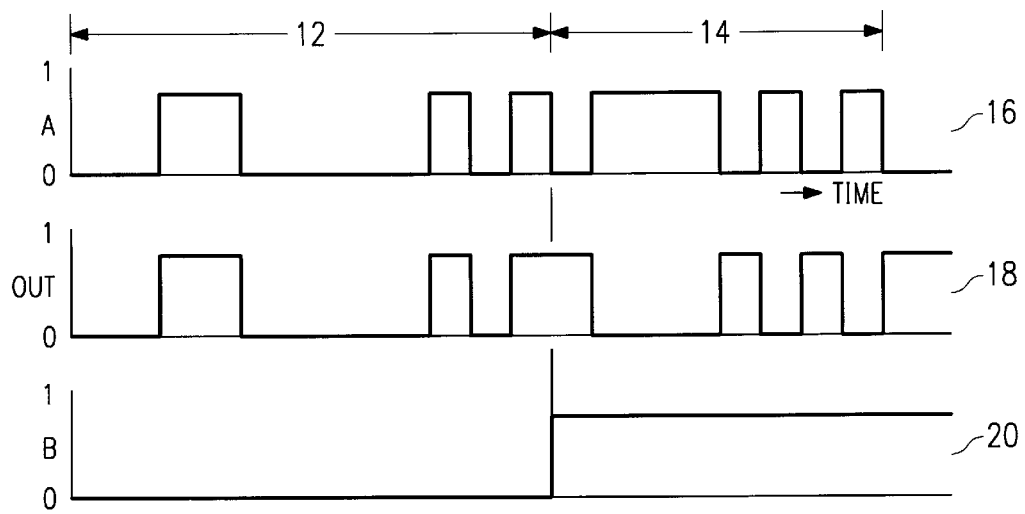
FIG. 1a
FIG. 1b
(PRIOR ART)
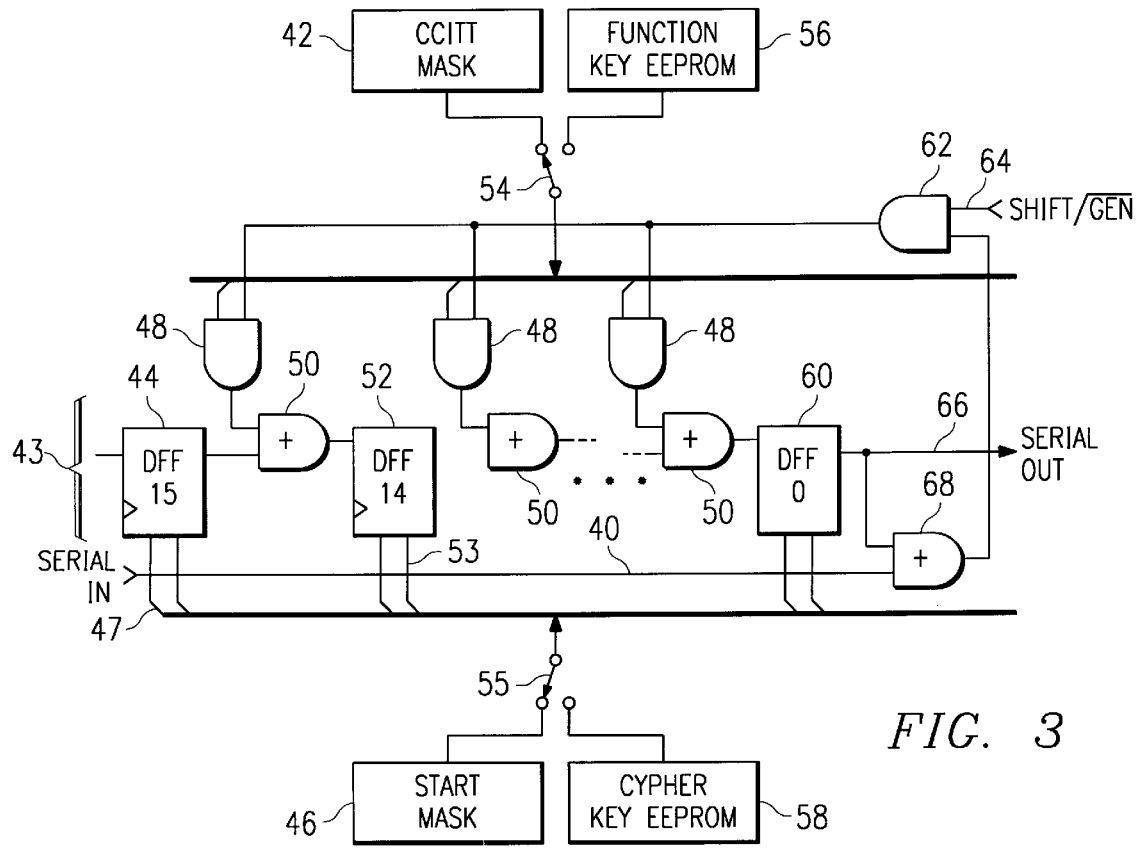
FIG. 3

LOW COST ENCRYPTION TRANSPONDER

CROSS-REFERENCE TO RELATED APPLICATIONS

The following commonly assigned patent applications are hereby incorporated herein by reference:

| Patent Number/Ser.No. | Filing Date/Issue Date | TI Case Number |
|---|---|---|
| 5,430,447 | 07/04/95 | TI-16885 |
| 5,450,088 | 09/12/95 | TI-16688 |
| 5,053,774 | 10/01/91 | TI-12797A |

FIELD OF THE INVENTION

This invention pertains to transponders used in wireless security and identification systems and more specifically to the use of economical encryption techniques to protect against unauthorized access to the equipment or data secured by such transponders.

BACKGROUND OF THE INVENTION

Batteryless radio frequency identification (RF-ID) systems rely on the rectification of the interrogation signal for power as has been taught in the U.S. Pat. No. 5,074,774 of Josef Schuermann et al, issued Oct. 1, 1991. This, in turn, requires that the transponder circuitry consume very little power. The application of such transponders, such as for animal identification, requires that the packaging be quite small. As a result of these constraints, most such transponders have read-only capability. As an example of an unsuitable approach for these applications, systems, such as that described in U.S. Pat. No. 5,310,999, "Secure Toll Collection System for Moving Vehicles", issued May 10, 1994, would consume far too much power, be too bulky and cost too much. The continued growth of applications of RF-ID systems requires improvements in avoiding false interrogations and data modification either deliberate or accidental.

Improved RF-ID systems have Read/Write transponders as disclosed in U.S. Pat. No. 5,450,088 issued Sep. 12, 1995, and are used in airline baggage tracking, warehouse goods tracking and assembly line piece part tracking. In the patent reference mentioned above, the application of toll collection from a rapidly moving vehicle requires a remote Read/Write capability with rapid response time. Some automobiles are now provided with remote transmitters for unlocking doors, fuel tanks and luggage compartments. Increased security as well as vehicle immobilization is highly desirable. Because of the added protection required to prevent unauthorized persons from realizing personal gain, some sort of encryption capability within the remote transponder is required to achieve more security.

Additionally, in all electrical information transmission systems, due consideration must be given to the effects of noise. Noise is any unwanted signal and may originate from different sources. The nature of errors in telecommunication systems is very important in considering error detection. The transponders, generally of the type described in U.S. Pat. No. 5,430,447 issued Jul. 4, 1995, unlike conventional computerized transponders, response data is in the form of a binary digit stream rather than byte type data with header protocols, start and stop bits, etc. that are common to the computer communications art. There are numerous methods involving software manipulation of bytes for encrypting and decrypting data streams. However, these methods do not apply because of high complexity and high cost.

An alternative method to determine whether the bits in a telegram have been properly received consists of appending an additional block of bits to each telegram. This additional block of bits, data, could be calculated out of the telegram data bits using a specific algorithm. For example, CRC-CCITT is one error detection algorithm which could be used but there are also many other algorithms used in several application areas which work on a similar basis. FIG. 2 shows the pertinent portion of a prior art CCITT CRC generator. This consists of a 16 bit shift register 22 (whose data flip-flops are labeled B0 . . . B15) with three XORs 24, 28, 29 in the feedback loop. B0 . . . B15 have a common clock line 30 which is created from the received data by clock generator 21 and a power up reset line 32. The previously described gating terminals B of the XORs 24, 28 are tied to 26 which is the output of XOR 29 and the input of the shift register 22. XOR 29 has one input from the output of shift register 22 and the other from the data input 27. XOR 24 has the other input from B11 and its own output to the data input of B10. In similar manner XOR 28 is tied between B4 and B3. The starting condition of shift register 22 is determined by Reset line 32. At power up, all 16 bits, B0 . . . B15, are set to logic 0.

An implementation of the prior art CRC-CCITT generator of FIG. 2 is described. A Frame BCC is generated in the interrogator from the Command/Address byte, the Data and Data BCC. The transponder receives the Frame BCC from the interrogator and applies the received bits of data to the CRC generator generating a new BCC, calculated from the CCITT algorithm. The comparison of the two BCC's, received and newly calculated, provides evidence of receipt of valid or invalid data. If both BCC's are equal then the received data is valid, and if the BCC's are not equal then the user data and/or the transmitted BCC must be corrupted. In actuality, the comparison is performed by continuing the generation of the new BCC within the interrogator while still receiving the transponder response data and BCC until all bits are received and then comparing the content of the registers to zero. If the content of the registers in the interrogator is zero then the received data is valid, and if the content of the registers is not zero, then the user data and/or the transmitted BCC must be corrupted The algorithm of the CRC-CCITT generator shown in FIG. 2 is well known and so fails to provide any security measure although it does provide a means for checking the validity of the received data regardless.

SUMMARY OF THE INVENTION

The object of the invention is to overcome the previously mentioned problems and to provide greater security for batteryless, remote transponders against undesired intrusion whether from deliberately hostile sources or noise, e.g.accidental radio interference. This invention describes novel methods of incorporating a method of cyclic redundancy checking (CRC) which is used in this invention to also generate a digital signature. Such CRC hardware generates a random bit stream which repeats itself exactly after a known and pre-determined number of bits. Because of the CRCs properties, in this invention an interrogation signal or challenge of a variable length random bit stream will result in a predictable, unique digital signature.

A 16 bit system is described for convenience but not as a constraint. The variations achieved by a 16 bit Function Key, which determines the encryption procedures, i.e. which XOR will be activated and which XORs will be deactivated (where activated means that the output of a shift register cell is EXOR combined with the output (GENOUT) of the generator and deactivated means the EXOR is transparent and the shift register cells work in normal shift mode) plus another independent 16 bit word Cypher Key (that determines a shift register starting position) reduces an intruders chance of success to 1 in 4,294,967,296 per attempt. Novel means of achieving increased security while still obtaining a low cost, manufacturable device are disclosed and claimed. This invention comprises two modes of operation which increases the value and flexibility of this invention. The first mode of operation is the learn mode which provides means for initial checkout with no security. In the learn mode of operation, the interrogator and transponder may be switched to a predetermined error detection algorithm, i.e. CCITT(Start Mask, CCITT Mask), and certain information is programmed into the transponder memory such as identification numbers, serial numbers, passwords(i.e. selective addresses), the Cypher Key and the Function Key. During programming in the Learn Mode, all the bits, received from the interrogator, i.e programming information, are shifted through the preintialized CRC generator. The result remaining in the shift registers should be zero. In addition, once the transponder response is sent back to the interrogator, the response is also shifted through a preintialized CRC generator within the interrogator(which could be a software implementation). This insures protection of data during transfer from reader to transponder and from transponder to reader. Before locking these functions, which prevents further alteration of the the Cypher and Function Keys, control reads must be executed by the interrogator to check the validity of the programmed information by reading what was just programmed. However, neither the Cypher Key nor the Function Key are directly readable once programmed for security purposes and therefore an encryption, i.e. within the CRC generator, the initial Start Mask and CCITT Mask must be switched to the encrypted Cypher Key and Function Key, must be performed to verify the proper Cypher Key and Function Key were programmed into the transponder's memory.

In the second and encryption mode of operation, after a special Command/Address is transmitted, a Random Number (which may vary in length but which has a minimum length) is transmitted from the interrogator to the transponder which in turn generates the Signature by shifting the Random Number through the CRC Encryption Generator (initialized with the Cypher and Function Key). The Signature along with data, status and address are transmitted back to the interrogator which in the meantime has predetermined the awaited Signature using the same Cypher and Function Key also stored in non-voltaile non-readable memory within the interrogator. In actuality, the comparison is performed by continuing the generation of the new BCC within the interrogator while still receiving the transponder response data and BCC until all bits are received and then comparing the content of the registers to zero. If the content of the registers in the interrogator is zero then the received data is valid, and if the content of the registers is not zero, then the user data and/or the transmitted BCC must be corrupted. In other words, if the received Signature and calculated Signature are equal, validation is positive and a security function can be released i.e. immobilization of a car engine. Then post verification, the programmed data must be locked(especially the Cypher Key and Function Key) to protect them against reprogramming in the future. The lock provides the security because the Keys are known only by the interrogator and the transponder.

Thereafter, in the normal field of operation, after the programming and locking function is performed during the manufacturing process, only the encryption mode is used. The encryption mode is detected by the transponder because the first byte the transponder receives is the Command/Address byte which tells the transponder how many bits it is to receive, what function should be executed, i.e. encryption mode, and which page of the memory should be affected. Receipt of this command causes the transponder to interrupt generation of the Frame BCC, which was begun with the the first bit of the Command/Address byte, and to intialize the Generator with the Cypher Key and Function Key. Then, only the Challenge(Random Number) is shifted through the Generator in order to get the Signature for response.

BRIEF DESCRIPTION OF THE DRAWINGS

In the drawings, which form an integral part of the specification and are to be read in conjunction therewith, and in which like numerals and symbols are employed to designate similar components in various views unless otherwise indicated:

FIGS. 1a and 1b show an exclusive-or (XOR) used as a programmable inverter. (Prior art)

FIG. 3 is a partial schematic of the CRC generator according to a preferred embodiment of the invention.

DETAILED DESCRIPTION OF PREFERRED EMBODIMENTS

Figure 2:
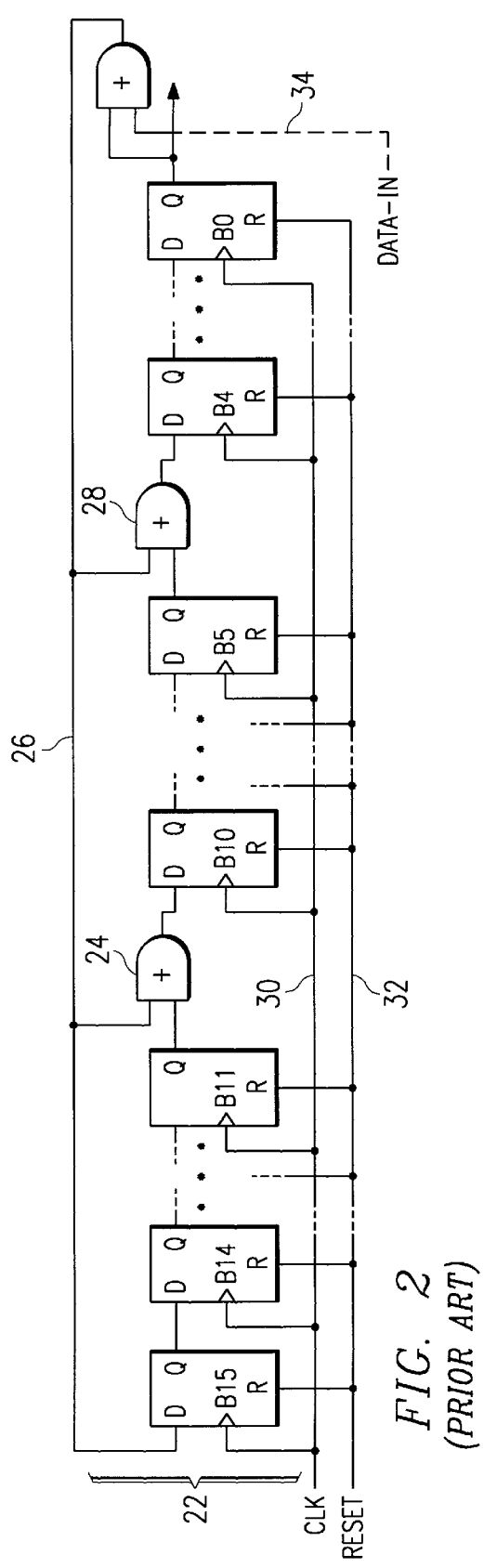
FIG. 2 illustrates a fragment of a standardized cyclic redundancy check (CRC) generator adopted by the Consultative Committee for Telephone & Telegraph (CCITT). (Prior art)
Figure 4:
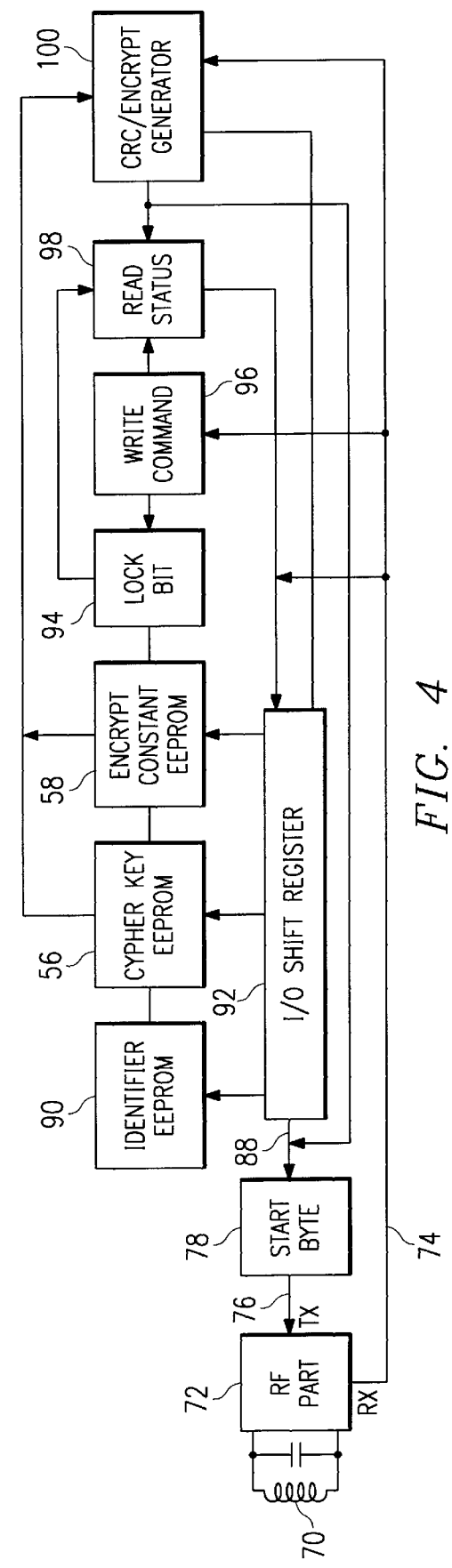
FIG. 4 is a block diagram of a batteryless transponder system incorporating the CRC generator according to a preferred embodiment of the invention and other means of increasing security.

This description of some of the preferred embodiments will be aided by the referral to FIG. 1a 4 and TABLE 1. The method of cyclic redundancy check (CRC) generation is so fundamental to this invention that a brief overview will be presented. A CRC generator is a serial input shift register that contains feedback from the output bit to other bit positions within the shift register. This feedback is effected by the use of exclusive-or (XOR) logic gates used as programmable inverters. FIG. 1(a) shows the symbol used herein for the XOR 10 having inputs A and B and output OUT. FIG. 1(b) shows the bit stream input 16 to input A and OUT bit stream 18 when modified by 20, the gating signal to B. During time interval 12, OUT replicates A while B is at logic 0. During time interval 14, OUT is the inversion (complement) of A while B is at logic 1. FIGS. 2 and FIG. 3 show the use of XOR gates in such manner.

As stated previously, the additional bits added to the end of a transponder response data stream are generated via a predetermined algorithm and are known as the error detection bits (BCC) or the Signature. The predetermined algorithm which generates these error detection bits is a function of the CRC generator. Depending upon the number of the XOR's and the initial states/programmed states of data flip flops and XOR's which make up the CRC generator, a unique algorithm is conceived, thereby creating a unique signature error detection system. If the transponder is to be programmed, the interrogation data stream comprises a Command/Address, a selective address, Data, Data BCC and a Frame BCC where the Data may comprise identification data and the Cypher and Function Keys. The interrogation data stream, is always sent least significant bit (LSB) first to the transponder. The first data bit (LSB data) is then exclusive or'ed (exored) with the LSB of the shift register and that result is shifted into the register's most significant bit (MSB). Bit by bit the received data stream from the interrogator, the Data, Data BCC, commands, addresses and Frame BCC are transferred through the CRC generator in the transponder and the end result remaining in the shift register must be zero. The transponder response data stream, comprising Data, Data BCC, and Status/Address data, is then shifted through the transponder's newly initialized CRC generator, and the resulting Frame BCC in addition to the transponder response data is transmitted to the interrogator. Once the transponder response data and Frame BCC is transmitted to the interrogator and is shifted through the interrogator's CRC generator. A match of the BCC's yields a valid, secure data transmittal.

According to a preferred embodiment of this invention, as shown in FIG. 3, the starting condition of the CRC shift register i.e. what value the output of all the flip flops are set to via the set and reset inputs (assuming a 16 bit length), is determined by a 16 bit word which may be a Starting Mask, which may be preprogrammed into the transponder and interrogator explicitly from the program generator at the manufacturing level, or a Cypher Key, which can be either preprogrammed at the manufacturing level or programmed into the transponder by the customer via the interrogation signal while in still in the mode, i.e. prior to locking the Cypher and Fucntion Keys. Rather than one possible starting condition of the shift register, this gives 65,536 possible starting positions which significantly enhances the security of the system.

In order to enhance security even further, this invention uses an XOR between every bit position i.e. between every flip flop of the shift register. Whether these XORs are inverting or not is determined by another 16 bit word referred to as the Function Key or Encryption Constant, also preprogrammed at the manufacturng level or programmed by the customer in learn mode, which creates yet another added measure of security. The Function Key can take any of 65,536 values which raises the total number of codes to 4,294,967,296. Not all of these codes are equally secure due to a shortening of the cycle of the random bit sequence. In other words, some combination's of XOR's will produce cyclic repetition of the output within a very short bit stream.

For convenience and in the first or learn mode of operation, the Function Key and Cypher Key may both be set to a predetermined value (such as the standard CRC-CCITT Mask and the Start Mask respectively) for post-manufacturing checkout or other less secure communication by preprogramnming both the Function Key and the Cypher Key in addition to a identification number, a serial number and passwords(selective addresss) into the transponderfm-terrogator at the manufacturing level. After programming the interrogator and/or transponder, the less secure information, i.e. the identification and serial numbers, is verified via a control read while the more secure non-readable predetermined codes (Cypher Key and Function Key) may be used for validation of the transponder using a challenge response principle while the transponder is in the second mode of operation, the encryption mode. In the encryption mode of operation, after a Command/Address is transmitted, a Random Number (which may vary in length but which has a minimum length) is transmitted to the transponder which in turn generates the Signature by shifting the Random Number through the CRC Encryption Generator (initialized with the Cypher and Function Key). The Signature is transmitted back to the interrogator which in the meantime has predetermined the awaited Signature using the same Cypher and Function Key also stored in non-voltaile non-readable memory within the interrogator. If the received Signature and calculated Signature are equal validation is positive and a security function can be released i.e. immobilization of a car engine. Security is based upon the number of possibilities of Cypher and Function Keys and on the fact that the Keys cannot be read out of the transponder or interrogator.

FIG. 3 and TABLE 1 may be used as references in the following description of the novel encoding technique of this invention. The transponder received serial bit stream is applied to input 40 of the CRC generator according to a preferred embodiment of the invention. The CRC generator transforms input 40 to an encoded output bit stream to output 66. The sequence of this output stream is determined by the internal components of the CRC generator, i.e. shift register comprising flip-flops and XOR's, and those components initial states and other previously described controls. The shift register 43 consists of the input data flip-flop 44, the internal flip-flops 52 and the output data flip-flop 60. These flip-flops, 44,52,60, represent the bit positions of the resulting encoded bit stream. A preferred embodiment according to this invention has sixteen XOR's and, except for 68, are labeled collectively as 50. All XORs 50 have one input tied to the output of one of the shift register 43 flip-flops 44, 52 or 60. The other input terminals of XOR's 50 are the feedback terminals (equivalent to B input of FIG. 1), which determine which of the XOR's 50 inverts the input and which XOR's 50 replicates the input, from flip flop's 44, 52 and 60, which in turn is determined by the output of the two input AND gates 48. AND gates 48 are used as switches whose state is governed by either the predefined function key 42 (such as the CCITT standard) or the more secure Function Key 56. Each of these Function Keys is stored in a semiconductor memory such as an EEPROM. In this manner, one of the 65,536 possible Function Keys is implemented to select which of the XOR's 50 are in the feedback loop. Whether the CCITT or secure Function Key is selected is determined by the position of Switch 54 which can be controlled by internal mechanical switches or decoded from the data stream.

At power up and in learn mode, the initial state of each cell of the shift register 43 is determined by the Start Mask 46, typically '00 . . . 0'. This Start Mask 46 along with the CCITT Mask 42 is used for cyclic redundancy checking during the reception of data to be programmed and locked in the transponder EEPROM from the interrogator and during response of data and status messages to the interrogator from the transponder. The Cypher Key is available from Cypher Key EEPROM 58 and the Function Key is available from Function Key EEPROM 56 when the generator works in the encryption mode, i.e. when the interrogator sends a challenge to the transponder to receive the Signature back for validation. At this stage, neither the Cypher Key nor the Function Key used during the encryption process can be read by the interrogator. Only the interrogator which has programmed and locked the Keys can predetermine at once the Signature (the content of the transponder's shift register after the challenge is shifted through the generator). Whether Start Mask 46 or Cypher Key 58 is selected is determined by the position of switch 55 and whether the CCITT Mask or the Function Key is selected is determined by switch 54 both of which can also either be controlled by internal mechanical switches or decoded from the bit stream.

FIG. 3 is schematic in nature and does not show every wire. The reset bus 47 and set bus 53 are each 16 bits wide and are only effective during power up in a manner determined by either Start Mask 46 or Cypher Key 58 as controlled by switch 55. As the input bit stream received on 40 is applied to XOR 68, the output of XOR 68 is either inverted or replicated depending on the state of flip flop 60 and the input bit stream. The state of 60 is governed by the prior history being fed back to the other stages of the shift register. Regardless of how random the output bit stream on output 66 may appear, the sequence is governed by the Function Key and the Cypher Key such that the interrogating station may predict the exact output sequence that 66 is expected to return after all challenge bits sent to the transponder have been shifted through the generator. The challenge will be a fixed or variable number of bits and the response a fixed number of bits. When the number of challenge bits falls below a certain limit, which is preferably greater than the number of shift register cells, i.e. 41, the transponder should fail to respond with a Signature in order to prevent discovery of the Function Key and the Cypher Key via single step actions by instead discharging automatically upon receipt of less than the predetermined number of bits. Having the response a fixed number of bits enables a rapid response system without undue complication or power consumption by the batteryless transponder.

FIG. 4 is a block diagram of a possible configuration for a batteryless transponder using the CRC generator just described in FIG. 3 and TABLE 1. The frequency of operation is determined by the tuned circuit 70. In the receive mode, the power for the transponder is also derived from the energy received and stored in a capacitor in lieu of a battery to supply power for the transponder in the transmitting mode. The power supply, transmitter, modulator and receiver are all contained in block 72. The receiver output 74 is supplied to the CRC generator 100 according to a preferred embodiment of the invention as previously described. This is not to be confused with I/O shift register 92 which is used for several other purposes. The Function Key 56 and Cypher Key 58 are the same as previously described. The initial bit sequence is administrative in nature. After a certain time interval a ready signal with a start byte from 78 and the unique identification number bit sequence controlled by EEPROM 90 are transmitted on the transmitter data bus 76. Other identifiers relative to the Cypher Key 58 and Function Key 56 may also be supplied. When lock bit 94 is "open", the Cypher Key 58 and Encryption Constant 56 may both be changed if desired depending on the write command 96. The control status is governed by the read status 98. After the internal "combination" is in the desired state, the lock bit 94 is "locked" such that no further alteration of the Encryption Constant or Cypher Key is possible. In this locked condition, the return bit string to the interrogating station is applied at 88 to modulate that data being transmitted from the batteryless transmitter. This bit string, though random, is predictable by the interrogating station to verify the security of the transponder.

In addition, although a preferred embodiment of the invention entails the use of an encryption generator in the transponder, an second preferred embodiment according to the invention involves implementation of a CRC-generator in the interrogator for generation and check of the Data BCC and the frame BCC and for prediction of the Signature of the Encryption generator. Therefore, an example of the Cyclic Redundancy Check (CRC) of the Data Block Check Character (BCC) performed by the interrogator is described. A transponder could have 64 user bits, comprising the unique transponder ID and 16 error detection bits or Data BCC in it's transmitted data stream. During the manufacture of the transponder, both the unique ID number of the transponder and the Data BCC(calculated by the interrogator software from the unique number according to a predetermined algorithm, i.e. the CCITT algorithm) will be programmed into the transponder memory. During the receive phase the interrogator receives not only status and address information, but also a Frame BCC, the transponder identification number and the transmitted (precalculated) Data BCC. To ensure the integrity of the received user data, the reader, typically via software manipulation, checks to determine whether the Data and Data BCC have been changed accidentally in memory, due to weaknesses in the memory, or during transmission to the interrogator. In addition, commands, addresses and status messages must be protected against noise in the RF channel using the Frame BCC. Although the CRC in the interrogator could be performed with a hardware CRC generator designed as a special hardware module in the interrogator microcontroller, typically the CRC generator is a software check of the validity of the received data. A software check is typically performed due to the ease of protecting against manipulation by using mask programmed single chip computers with built-in non-volatile memory and protection against memory readout. Generally, the received Signature is compared to the Signature predetermined by the interrogator, however, the received Signature could be shifted through the interrogators CRC encryption generator with a zero resulting from such procedure. Of most importance is that the keys are never communicated by external busses.

While this invention has been described with reference to illustrative embodiments, this description is not intended to be construed in a limiting sense. There are so many variants to the coding sequence, it is impossible to explicitly enumerate them. However, knowing the internal connections of the transponder makes all such sequences predictable. AU such predictable sequences are claimed by this invention. Pending applications concerning programming, reading and locking procedures are equally applicable to this invention. One pending application, TI-16885, uses a combination of selective addressing and segment coding techniques which are also allowable techniques with this invention. Although shown schematically as separate electronic entities for illustrative purposes, the Cypher Key(s) and Encryption Constant(s)(Function Key) may both be contained in a single electrically alterable read only memory or EEPROM along with all other administrative binary words required. Also for illustrative purposes, 16 separate set and 16 reset lines were shown to initialize the CRC shift register. Since these are only used at power up, a brute force hold down or pull up of the output of each data flip-flop in the CRC generator would be equally satisfactory. The number of 16 bits was used throughout for an illustrative example. Any number of bits may be used. In the binary IC world 8, 16, 24, 32 and 64 bit parts are readily available but custom parts can use a non-standard number of bits.

Various modifications and combinations of the illustrative embodiments, as well as other embodiments of the invention, will be apparent to persons skilled in the art upon reference to the description. It is therefore intended that the appended claims encompass any such modifications or embodiments.

TABLE 1

| ID# | Description | Function |
|---|---|---|
| 40 | Data input bus | Bit stream that is to be encoded |
| 42 | Fixed 16 bit CCITT mask. May be provided by ROM of any technology. | To provide a known encryption procedure for checkout or other less secure use by dictating which XOR's invert and which XOR's don't invert. |
| 43 | Digital shift register | Shifts one bit position per clock cycle |
| 44, 52, 60 | Internal data type flip-flops, 16 in this example. | Sets output to same logical condition (1 or 0) as the data (D) input on each clock cycle. May also be set to 1 or reset to 0 regardless of clock condition. |
| 46 | Start Mask for CRC-CCITT. May be provided by ROM of any technology. | Sets shift register 43 to predetermined starting value. |
| 47 | 16 individual flip-flop reset lines. | Determine which of the 16 flip-flops start at logical 0. |
| 48 | Logical AND gates. | Select which XORs 50 invert their input and which replicate their input. |
| 50 | Exclusive ORs (XOR) logic gates. | Programmable inverters. |
| 53 | 16 individual flip-flop set lines. | Determine which of the 16 flip-flops start at logical 1. |
| 54, 55 | Switch | Select between known Function Keys and Cypher Keys. |
| 56 | Semiconductor 16 bit, multiple word, programmable memory such as EEPROM. | Unique Function Key to secure transponder. |
| 58 | Semiconductor 16 bit, multiple word, programmable memory such as EEPROM. | Unique Cypher Key to determine starting condition of shift register 43. |
| 62 | 2 Input logical AND gate. | Enables 'shift' respectively 'generate' function by opening/closing the feedback loop of CRC/Encryption Generator |
| 66 | Encoded output | |
| 68 | XOR | Takes the combination of the input data stream and the output of 60 to determine whether a digital 1 or 0 is fed back to the shift register 43 stages. |

I claim:

1. An encryption shift register generator for encrypting an input serial bit stream signal comprising:

a shift register, comprised of a plurality of flip flops, including a first and a last flip flop, having set and reset lines for setting the output of said plurality of flip flops irrespective of said input to said plurality of flip flops and in response to either a Start Mask or a Cypher Key;

a plurality of two input AND gates having one input connected to either a standard mask or a Function Key and a second input connected to the output of another two input AND gate;

a plurality of two input XOR gates having one input connected to the output of said plurality of flip flops and a second input connected to the output of said plurality of AND gates for inverting or not inverting said shift register output;

another two input XOR gate having one input connected to an input serial bit stream and a second input connected to the output of said last flip flop; and another two input AND gate having one input connected to the output of said another two input XOR gate and a second input connected to said standard mask or said Function Key and an output connected to the input of said plurality of said two input AND gates for enabling a feedback loop of said shift register generator.

2. An encryption generator according to claim 1 wherein said plurality of flip flops and said plurality of two input XOR gates are equal in number.

3. An encryption generator according to claim 2, wherein said number is 16.

4. An encryption generator according to claim 1 wherein said start mask is preprogrammed into a memory during manufacturing and determines which shift registers are set and which are reset.

5. An encryption generator according to claim 4, wherein said standard mask is a CCITT algorithm.

6. An encryption generator according to claim 1, wherein said Cypher Key is programmed into a memory post manufacturing by a customer.

7. An encryption generator according to claim 1, further comprising a control logic for counting the received serial input bits and in response thereto responding if an adequate number of bits is received or not responding if the number of received bits is inadequate.

8. An encryption generator according to claim 7, wherein said adequate number of bits is the number of flip flops in said shift register.

9. An encryption generator according to claim 1, wherein said Function Key is programmed into a memory post manufacturing by a customer.

10. An RF-ID system comprising:

a transponder, having a shift register generator and an EEPROM memory, for receiving an interrogation signal and transmitting response data;

an interrogator, having a shift register generator and an EEPROM memory, for transmitting an interrogation signal and receiving said response data wherein said interrogation signal and/or said transponder response data are encrypted via said shift register generator comprising:

a shift register, comprised of a plurality of flip flops, including a first and a last flip flop, having set and reset lines for setting the output of said plurality of flip flops irrespective of said input to said plurality of flip flops and in response to either a start mask or a Function Key;

a plurality of two input AND gates having one input connected to either a standard mask or an encrypted cypher key and a second input connected to the output of another two input AND gate;

a plurality of two input XOR gates having one input connected to the output of said plurality of flip flops and a second input connected to the output of said plurality of AND gates for inverting or not inverting said shift register output;

another two input XOR gate having one input connected to an input serial bit stream and a second input connected to the output of said last flip flop; and another two input AND gate having one input connected to the output of said another two input XOR gate and a second input connected to said start mask or said Function Key and an output connected to the input of said plurality of said two input AND gates for enabling a feedback loop of said shift register generator.

11. An RF-ID system according to claim 10 wherein said plurality of flip flops and said plurality of two input XOR gates are equal in number.

12. An RF-ID system according to claim 11, wherein said number is 16.

13. An RF-ID system according to claim 10 wherein said start mask is preprogrammed into a memory during manufacturing and determines which shift registers are set and which are reset.

14. An RF-ID system according to claim 13, wherein said standard mask is a CCITT algorithm.

15. An RF-ID system according to claim 10, wherein said Cypher Key is programmed into a memory post manufacturing by a customer.

16. An RF-ID system according to claim 10, further comprising a control logic for counting the received serial input bits and in response thereto responding if an adequate number of bits is received or not responding if the number of received bits is inadequate.

17. An RF-ID system according to claim 16, wherein said adequate number of bits is the number of flip flops in said shift register.

18. An RF-ID system according to claim 16, wherein not responding entails discharging a charge circuit.

19. A method of enhancing the security of the data exchange between an interrogator, having a memory and a CRC generator, and a transponder, having a memory and a CRC generator, comprising the steps of:

programming less secure data which is able to be read and more secure data which is not able to be read into said transponder memory and programming said more secure data into said interrogator;

verifying the validity of the programming of the less secure data by executing a control read of the less secure data;

verifying the validity of the programming of the more secure data by executing an encryption wherein said encryption comprises the steps of;

transmitting a challenge to the transponder;

generating a Signature which is a function of said more secure data;

transmitting said Signature along with other transponder response data back to the interrogator; and verifying said Signature with said more secure data and authorizing a function in response to a verified Signature.

20. The method according to claim 19, wherein said more secure data is a Cypher Key.

21. The method according to claim 19, wherein said more secure data is a Function Key.

22. The method according to claim 19, wherein said more secure data is both a Cypher Key and a Function Key.

23. The method according to claim 19, wherein said Signature is a block check character.

24. The method according to claim 19, wherein said less secure data is a frame BCC, identification data, selective address data and status data.

25. The method according to claim 19, wherein said challenge is a random number which has a length, at a minimum, of the number of shift registers in the CRC generator.

26. The method according to claim 19, and further comprising locking said more secure data into said transponder memory such that said more secure data cannot be altered or read.

27. The method according to claim 26, wherein said more secure data is a Cypher Key and a Function Key.

28. The method according to claim 19, wherein said memory is a non-volatile, erasable, electrically programmable memory.

29. The method according to claim 19, wherein said generation of said Signature comprises the steps of applying said challenge to a CRC generator predisposed with said more secure data, and with the resulting bits remaining in the shift register comprising said Signature.

30. The method according to claim 19, wherein said other transponder response data is a frame BCC, identification data, status and address data.

31. The method according to claim 19, wherein said verifying comprises the steps of applying said other transponder response data to a CRC generator predispositioned with said more secure data, and with the resulting bits remaining in said register equaling zero.

32. The method according to claim 19, wherein said CRC generator within said transponder comprises a shift register, comprised of a plurality of flip flops, having set and reset inputs, and a plurality of exclusive OR's, each having two inputs.

33. The method according to claim 32, wherein said more secure data is a Cypher Key and a Function Key.

34. The method according to claim 33, wherein said Cypher Key determines which of said exclusive OR gates will be inverting and which will not be inverting said inputs.

35. The method according to claim 33, wherein said Function Key determines which of said flip flops will be set and which of said flip flops will be reset.

36. The method according to claim 19, wherein said verifying comprises the steps of comparing said Signature to a predetermined Signature generated by said interrogator.

* * * * *